(12) United States Patent
Jones et al.

(10) Patent No.: US 7,619,039 B2
(45) Date of Patent: *Nov. 17, 2009

(54) HIGH BUILD DISPERSIONS

(75) Inventors: Clay Woodward Jones, Washington, WV (US); Robert John Cavanaugh, Cincinnati, OH (US); Walter Thomas Krakowiak, Wilmington, DE (US); Richard A. Morgan, Vienna, WV (US); Theodore A. Treat, Washington, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/407,166

(22) Filed: Apr. 19, 2006

(65) Prior Publication Data

US 2006/0189765 A1  Aug. 24, 2006

Related U.S. Application Data

(63) Continuation of application No. 10/099,192, filed on Mar. 13, 2002, now abandoned.

(60) Provisional application No. 60/275,441, filed on Mar. 13, 2001, provisional application No. 60/345,298, filed on Jan. 4, 2002.

(51) Int. Cl.
C08F 259/00 (2006.01)
C08F 259/10 (2006.01)
C08L 43/00 (2006.01)

(52) U.S. Cl. .................. 525/276; 524/535; 526/242

(58) Field of Classification Search ............. 525/276; 524/535; 526/242
See application file for complete search history.

(56) References Cited

U.S. PATENT DOCUMENTS

| 3,037,953 | A | 6/1962 | Marks et al. |
| 3,142,665 | A | 7/1964 | Cardinal et al. |
| 3,819,594 | A | 6/1974 | Holmes et al. |
| 4,837,267 | A | 6/1989 | Malhotra |
| 5,296,165 | A | 3/1994 | Shimizu et al. |
| 5,324,785 | A * | 6/1994 | Noda et al. ............. 525/276 |
| 5,576,381 | A | 11/1996 | Bladel et al. |
| 6,136,933 | A | 10/2000 | Jones |
| 6,429,258 | B1 | 8/2002 | Morgan et al. |
| 6,841,594 | B2 * | 1/2005 | Jones et al. ............. 523/201 |

FOREIGN PATENT DOCUMENTS

| EP | 0322877 A2 | 7/1989 |
| EP | 0 969 055 A1 | 1/2000 |
| EP | 1 059 342 A1 | 12/2000 |
| WO | WO 98/58984 | 12/1998 |

OTHER PUBLICATIONS

Sperti & Starkwather, Fortschr. Hochpolm-Forsch. BD. 2, 465-495 (1961).

* cited by examiner

*Primary Examiner*—Nathan M Nutter (57) ABSTRACT

An aqueous dispersion of non-melt-processible fluoropolymer, process for making same and concentrated dispersion and powder obtained from the dispersion. The fluoropolymer particles of the dispersion have a standard specific gravity (SSG) of less than 2.225 and comprise a core of high molecular weight polytetrafluoroethylene and a shell of lower molecular weight polytetrafluoroethylene or modified polytetrafluoroethylene. At least about 1.5 weight % of the fluoropolymer particles comprise substantially rod-shaped particles having a length to diameter ratio greater than about 5.

10 Claims, 6 Drawing Sheets

HIGH BUILD DISPERSIONS

FIELD OF THE INVENTION

This invention relates to dispersions of non-melt-processible fluoropolymers and coatings formed from the dispersions.

BACKGROUND OF THE INVENTION

Fluoropolymers are applied to a wide number of substrates in order to confer release, chemical and heat resistance, corrosion protection, cleanability, low flammability, and weatherability. Coatings of polytetrafluoroethylene (PTFE) homopolymers and modified PTFE provide the highest heat stability among the fluoropolymers, but unlike tetrafluoroethylene (TFE) copolymers, cannot be melt processed to form films and coatings. Therefore other processes have been developed for applying coatings of PTFE homopolymers and modified PTFE. One such process is dispersion coating which applies the fluoropolymer in dispersion form. Dispersion coating processes typically employ such fluoropolymer dispersions in a more concentrated form than the as-polymerized dispersion. These concentrated dispersions contain a significant quantity of surfactant, e.g. 6-8 weight percent. Such dispersion coating processes include the steps of applying concentrated dispersion to a substrate by common techniques such as spraying, roller or curtain coating; drying the substrate to remove volatile components; and baking the substrate. When baking temperatures are high enough, the primary dispersion particles fuse and become a coherent mass. Baking at high temperatures to fuse the particles is often referred to as sintering. In many applications, the performance of a fluoropolymer coating is dependent on the thickness of the film applied and a thick coating is frequently desired. However, if fluoropolymer dispersions are applied too thickly in a single application, the coating will suffer crack formation and the quality of the coating will be diminished or rendered unacceptable for the desired use. Consequently, when thicker coatings are desired, a dispersion coating process essentially requires several passes to create a coating of the desired thickness. There is an economic penalty for additional passes and coating processes with fewer passes are highly desirable. In addition, to increase coating thickness per pass, formulations often include large amounts of non-ionic surfactant and polymeric acrylic film-forming aids. High levels of such materials can be detrimental by imparting unwanted color and increasing the amount of carbonaceous residues in the film after sintering. These residues may interfere with the release properties of the film.

The suitability of fluoropolymer dispersions for forming thick coatings can be evaluated using a test referred to as Critical Cracking Thickness (CCT). Critical Cracking Thickness is a measure of the thickness of a coating formed from polymer dispersion that can be applied to a substrate in one pass without cracking during drying and subsequent baking.

Previous attempts to overcome the problem of crack formation are found in the inventions of Blaedel et al, U.S. Pat. No. 5,576,381. Blaedel et al. propose a mixture of dispersions of non-melt-processible fluoropolymers A and B of varying particle size. Fluorine polymer A has a number average particle size of from 180-400 nm and fluorine polymer B has a number average particle size lower by a factor of from about 0.3 to approximately 0.7, the entire dispersion having a non-monomodal number distribution of the particle diameter. In PCT publication WO 9858984, Blaedel et al. propose another mixture of fluoropolymer dispersions of varying particle size. In this invention, fluorine polymer A has a number average particle size of at least 200 nm and fluorine polymer B has a number average particle size of at most 100 nm. One of the components of A and B is a thermoplastic and one is non-melt-processible and the entire dispersion has a non-monomodal number distribution of the particle diameter. Both dispersion mixtures are disclosed as suitable for soaking, impregnating or coating porous surfaces of fibers and fabrics as well as smooth substrates such as metal, ceramic, glass and plastic substrates.

Lenti et al. have also addressed the problem of crack formation in dispersion applied coatings. European Patent Application 0 969 055A1 targets increasing CCT of dispersion coated metal by providing a mixture of copolymer dispersions also of varying particle size. TFE copolymer of dispersion A has an average particle size in the range of 180-400 nm and TFE copolymer of dispersion B has an average particle size of 20-60 nm and the particle sizes of dispersion B compared to those of dispersion A is lower than 0.3. Aqueous dispersions of A are obtainable by standard emulsion polymerization processes where aqueous dispersions of B are preferably obtained by the microemulsion process described in MI 98A001519.

Yet another mixture of dispersions is proposed in European Patent Application 1 059 342A1 to Marchese et al. In this reference increased CCT is attributed to a mixture of dispersions. That mixture is a combination of dispersion A of TFE homopolymer or copolymer particles with smaller particles of dispersion B of TFE copolymer that is not melt-processible. Dispersion B has limitations on the content of fibril-type particles (i.e., particles having a length/diameter of greater than five), with low amounts being preferred in order to avoid a decrease in CCT and other characteristics of coating performance over time.

To date the prior art disclosures for manufacturing coating compositions of high molecular weight fluoropolymer have been expensive and have failed to consistently achieve a level of significant CCT without blending two types of dispersion. What is desired is a non-melt-processible dispersion composition of high molecular weight fluoropolymer with the heat stability and abrasion resistance of high molecular weight PTFE, a high CCT and ease of application onto metal substrates and glass fabric for many uses in the architectural, industrial and home appliance areas. In addition, such fluoropolymer dispersion would be easy to manufacture having properties without variations from batch-to-batch due to blending inconsistencies.

Further the prior art solutions that address dispersion coatings with a high CCT neglect the important aspect of shear stability of the dispersion. In dispersion coating applications such as curtain coating, a fraction of the coating stream is deposited on the substrate requiring the remainder of the stream to be recycled. The recycled fraction needs to be able to withstand the subsequent multiple pumping and mixing operations necessary for a continuous process. A dispersion suitable for such processing should not easily coagulate when subjected to shearing forces. The resistance of the dispersion to premature coagulation can be measured by a parameter known as gel time and is an indication of the shear stability of the dispersion.

BRIEF SUMMARY OF THE INVENTION

The invention provides a dispersion of non-melt-processible fluoropolymer particles having a standard specific gravity (SSG) of less than 2.225 in aqueous medium. The fluoropolymer particles of the dispersion comprise a core of high molecular weight polytetrafluoroethylene and a shell of lower molecular weight polytetrafluoroethylene or modified polytetrafluoroethylene. At least about 1.5 weight % of the fluoropolymer particles comprise substantially rod-shaped particles having a length to diameter ratio greater than about 5. Preferably, at least about 50% of the fluoropolymer particles are generally cylindrical having a length to diameter ratio of greater than about 1.5.

In a preferred embodiment, at least about 1.5 to about 25 weight % of the fluoropolymer particles comprise substantially rod-shaped particles and more preferably about 1.5 to about 20 weight %. The rod-shaped dispersion particles preferably have an average diameter of less than 150 nm.

The invention further provides a coating composition formed from the concentrated dispersion and a surfactant and substrates coated with the composition. Non-melt-processible fluoropolymer powder obtained by coagulating and drying the aqueous dispersion is also provided.

Further provided is a batch process for producing non-melt-processible fluoropolymer dispersion comprising polymerizing tetrafluoroethylene in an aqueous medium in the presence a dispersing agent to produce polytetrafluoroethylene having an SSG of less than 2.225. The polymerization is carried out in two stages. During a first stage, a first amount of free radical initiator is added and during a second stage, a second amount free radical initiator and a telogenic agent are added. The first amount of initiator produces polytetrafluoroethylene having an average melt creep viscosity greater than about $1.2 \times 10^{10}$ Pa·s, and the second amount of initiator is at least about 10 times said first amount and being added before about 95% of the total tetrafluoroethylene has been polymerized. The polymerizing in the first stage is carried out so that at least about 1.5 weight % of the fluoropolymer particles comprise substantially rod-shaped particles having a length to diameter ratio of greater than about 5.

Coating compositions of this invention possess both a significant level of CCT and high shear stability. A concentrated dispersion of non-melt-processible fluoropolymer particles of this invention in aqueous medium preferably has a CCT of greater than about 24 micrometers when the fluoropolymer solids content is about 60 weight % and the surfactant content is about 8 weight %, and a CCT of greater than about 20 micrometers when the surfactant content is about 6 weight %. The concentrated dispersion preferably has a gel time of greater than about 700 seconds when the fluoropolymer solids content is about 60 weight % and the surfactant content is about 6 weight %. In applications in which the coating is subjected to flexing as in coatings of glass cloth, the flex life of the coating is improved. Dispersions of this invention have an MIT Flex Life for coated glass fabric of greater than 10,000 cycles in the warp direction and/or in the fill direction.

DETAILED DESCRIPTION OF THE INVENTION

The invention relates to a dispersion of non-melt-processible fluoropolymer particles in aqueous medium. The fluoropolymer particles comprise a core of high molecular weight polytetrafluoroethylene (PTFE) and a shell of lower molecular weight polytetrafluoroethylene or modified polytetrafluoroethylene.

Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. The modifying comonomer can be, for example, hexafluoropropylene (HFP), perfluoro(methyl vinyl ether) (PMVE), perfluoro(propyl vinyl ether) (PPVE), perfluoro(ethyl vinyl ether) (PEVE), chlorotrifluoroethylene (CTFE), perfluorobutyl ethylene (PFBE), or other monomer that introduces side groups into the molecule.

The fluoropolymer particles have a standard specific gravity (SSG) of less than 2.225, preferably less than 2.220, and more preferably from 2.180 to 2.215. The SSG is generally inversely proportional to the molecular weight of PTFE or modified PTFE. SSG alone, however, cannot specify molecular weight as it is also dependent on the presence of modifier, the amount of modifier, and/or initiation by hydrocarbon initiators such as DSP. Also no agreement exists as to the correct mathematical form the relationship takes. The first representation of that relationship is expressed in a paper presented by Doban et al. at an ACS meeting on Sep. 18, 1956 which gives the number average molecular weight to be $$\overline{M}_n = 0.597 \, [\log_{10}(0.157/(2.306 - SSG))]^{-1}$$

with graphical data given in Sperati & Starkwather, Fortschr. Hochpolym-Forsch. Bd. 2, S.465-495 (1961). Another expression of this relationship is stated by Noda et al. in U.S. Pat. No. 5,324,785 as:

$\log_{10} M_n = 31.83 - 11.58 \times SSG$ in which $M_n$ is average molecular weight. These equations result in different molecular weights for the same SSG values.

Molecular weight can be more consistently related to melt creep viscosity (MCV) values for PTFE polymers and melt creep viscosity is used in the present application to describe the molecular weight of the polymer. Molecular weight is linearly related to melt viscosity in Pa·s to the $1/3.4$ power as stated in the following:

$$\overline{M}_n = (MCV^{1/3.4} - 663.963)/0.00021967$$

Melt creep viscosities for the fluoropolymer in accordance with the invention are preferably greater than about $1.4 \times 10^{10}$ Pa·s, more preferably greater than about $1.5 \times 10^{10}$ Pa·s. Melt creep viscosity in this application is measured by the procedure U.S. Pat. No. 3,819,594 with certain modifications discussed below.

The fluoropolymer dispersion of this invention is made by dispersion polymerization (also known as emulsion polymerization). The product of dispersion polymerization can be used as aqueous dispersion, optionally after concentrating and/or stabilizing with added surfactant as known in the art, or can be coagulated, isolated from the liquid medium, and dried. The concentrated dispersions are useful as coating or impregnating compositions and to make cast films.

In the manufacture of dispersions in accordance with the invention, the polymerization is carried out to form a particle structure in which molecular weight, and in some embodiments, composition vary from one stage of polymerization to another. The variation can be can be envisioned so as to view the particle as having discrete layers. While the properties of the "core" and "shell" cannot be measured independently by analytical methods, these concepts are equated with polymer formed, respectively, in first and later stages in the polymerization. The process produces PTFE of high molecular weight at the core of the particle and PTFE or modified PTFE of lower molecular weight near and/or at the surface of the dispersion particles. As will be discussed below, the distinction made herein between core and shell relates to the amount of initiator present during the first (core) stage of polymerization and during the later (shell) stage of polymerization as well as the presence or absence of telogenic agent and comonomer being introduced.

Particularly because of the core shell nature of the fluoropolymers of this invention, the melt creep viscosity measured at the end of the batch is a weighted average of melt creep viscosities of the PTFE formed during the batch. For a growing particle, each incremental volume with its molecular weight contributes to the average. If, for instance, the molecular weight is increasing during the batch, each incremental volume has a higher molecular weight than the last incremental volume and the average molecular weight is always lower than that of the last volume increment. The molecular weight of a volume increment is termed the instantaneous molecular weight and the number average molecular weight is given by the expression $$\overline{M_n} = \frac{\lim_{n \to \infty} \sum_{i=1}^{n} M_{ni} \Delta V}{\lim_{n \to \infty} \sum_{i=1}^{n} \Delta V}$$

where $M_{ni}$ is the instantaneous molecular weight and $\Delta V$ is a volume or weight increment. The instantaneous molecular weight for each volume increment is a value selected such that a numerically integrated solution of the above expression yields the experimentally determined average molecular weight at any point during the batch.

For the purposes of the present invention, the average molecular weight $M_n$ of the shell is determined by the numerical integration, using at least 5 volume or weight increments beginning with and including the increment in which the $M_{ni}$ is the highest and concluding with the end of the batch. The $M_n$ for the core is determined similarly using at least 30 volume or weight increments beginning with the start of polymerization and ending with and including the increment in which the $M_{ni}$ is the highest. Average melt creep viscosity is then determined using the formula stated above for the relationship of melt creep viscosity to $M_n$.

In accordance with a preferred form of the invention, the core of the particles comprises high molecular weight polytetrafluoroethylene having an average melt creep viscosity of greater than about $1.2 \times 10^{10}$ Pa·s, more preferably having an average melt creep viscosity greater than about $1.3 \times 10^{10}$ Pa·s, most preferably having an average melt creep viscosity greater than about $1.5 \times 10^{10}$ Pa·s. The shell preferably comprises lower molecular weight polytetrafluoroethylene or modified polytetrafluoroethylene with an average melt creep viscosity greater than about $9 \times 10^{9}$ Pa·s and less than the average melt creep viscosity of polytetrafluoroethylene of the core. Preferably, the average melt creep viscosity of the polytetrafluoroethylene or modified polytetrafluoroethylene of the shell is at least $0.1 \times 10^{10}$ Pa·s less, more preferably at least $0.2 \times 10^{10}$ Pa·s less, than the average melt creep viscosity of polytetrafluoroethylene of the core. Most preferably, the shell of lower molecular weight polytetrafluoroethylene or modified polytetrafluoroethylene has an average melt creep viscosity of about $9 \times 10^{9}$ Pa·s to about $1.3 \times 10^{10}$ Pa·s.

In fluoropolymers in accordance with the invention, the shell comprises about 5 to about 30% by weight of the particles. Preferably, the shell comprises about 5 to about 25% by weight of the particles, most preferably, about 5 to about 20% by weight of the particles. Preferably, the shell of the particles is polytetrafluoroethylene.

Fluoropolymers in accordance with the invention have the general character of known PTFE polymers made by dispersion polymerization processes. The resins of this invention isolated from dispersion and dried are non-melt-processable. By non-melt-processable, it is meant that no melt flow is detected when tested by the standard melt viscosity determining procedure for melt-processable polymers. This test is according to ASTM D-1238-00 modified as follows: The cylinder, orifice and piston tip are made of corrosion resistant alloy, Haynes Stellite 19, made by Haynes Stellite Co. The 5.0 g sample is charged to the 9.53 mm (0.375 inch) inside diameter cylinder which is maintained at 372° C. Five minutes after the sample is charged to the cylinder, it is extruded through a 2.10 mm (0.0825 inch diameter), 8.00 mm (0.315 inch) long square-edge orifice under a load (piston plus weight) of 5000 grams. This corresponds to a shear stress of 44.8 KPa (6.5 pounds per square inch). No melt extrudate is observed.

In a preferred embodiment of this invention, the fluoropolymer is fibrillating. Fine powder resin isolated from dispersion and dried can be formed into useful articles by a lubricated extrusion process known as paste extrusion. The resin is blended with a lubricant and then shaped by an extrusion process. The beading obtained is coherent and microscopic examination reveals that many particles are linked by fibrils of PTFE which have been formed despite the procedure being conducted well below the melt temperature. Thus by "fibrillating", it is meant that a lubricated resin forms a continuous extrudate when extruded through a 1600:1 reduction die at 18.4 weight percent isoparaffin lubricant sold under the trademark Isopar® K by ExxonMobil Chemical. A further strengthening of the beading beyond the "green strength" obtained by fibrillation is accomplished by sintering after the lubricant has been volatized.

Figure 3:
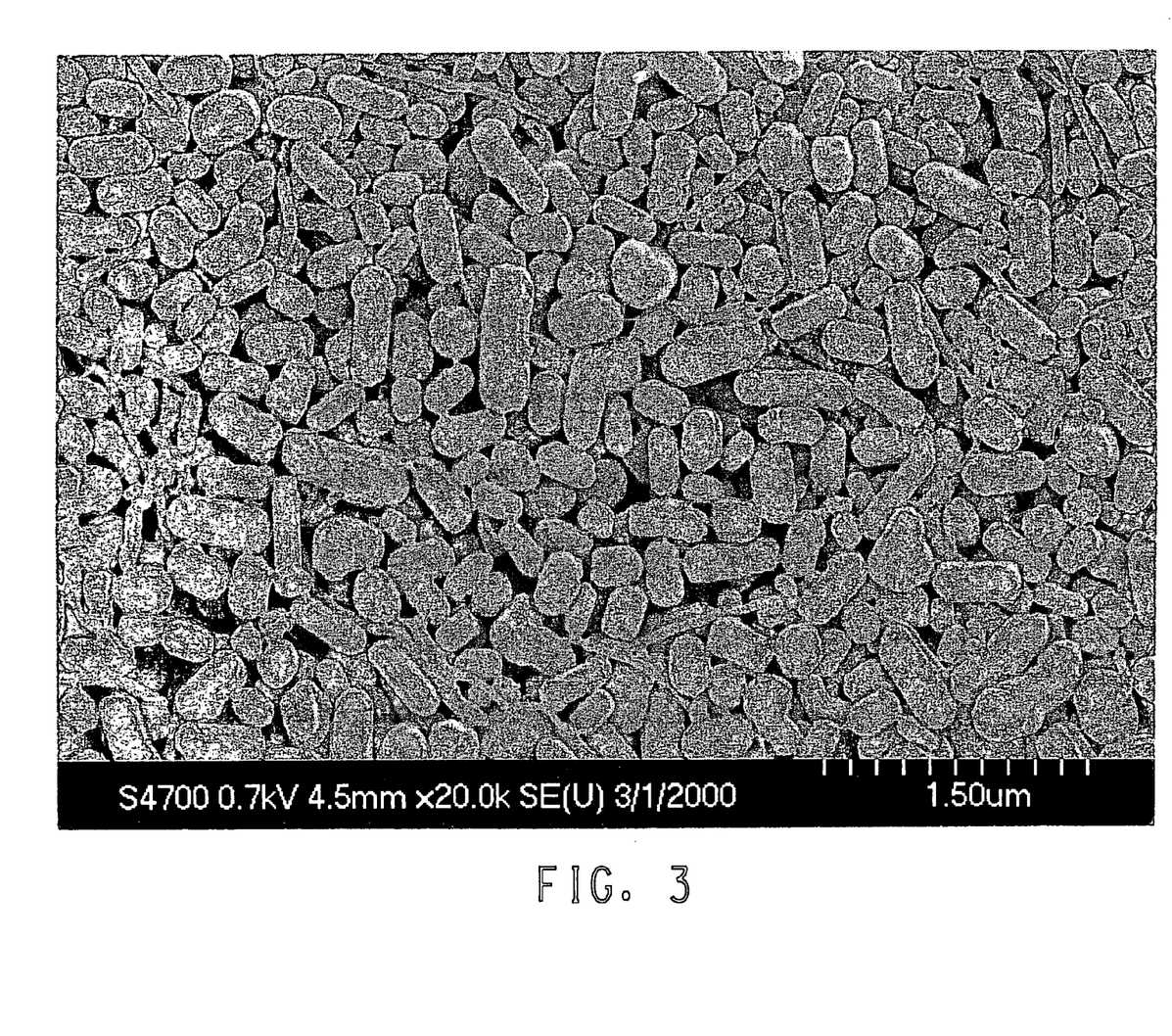
FIG. 3 is a SEM image of the dispersion of Example 1 at 20,000 magnification showing dispersion of this invention having a high molecular weight core of PTFE and a low molecular weight shell of PTFE. Note 1.50 micrometer scale bar.
Figure 5:
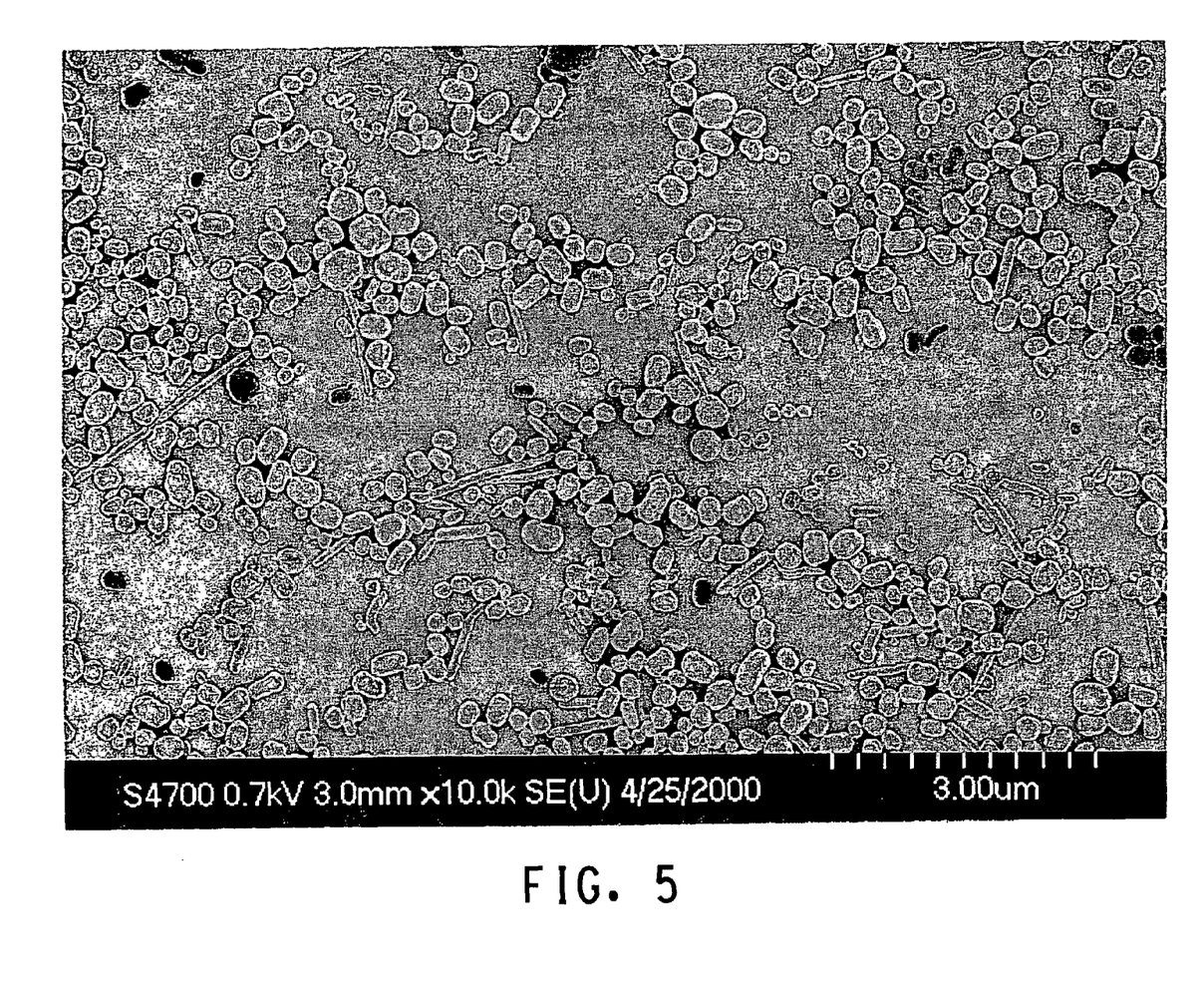
FIG. 5 is a SEM image of the dispersion of Example 4 at 10,000 magnification showing dispersion of this invention having a high molecular weight core of PTFE and a low molecular weight shell of modified PTFE. Note 3.00 micrometer scale bar.

In dispersions in accordance with the invention, at least about 1.5 weight % of the fluoropolymer particles comprise substantially rod-shaped particles having a length to diameter ratio of greater than 5. By rod-shaped it is meant that the particles are elongated such that they have a length to diameter ratio of greater than five. As illustrated in FIGS. 3 and 5, some of the rod-shaped particles appear to be straight and some the rod-shaped particles appear to be bent. In a preferred embodiment, about 1.5 to about 25 weight % of the fluoropolymer particles consist of substantially rod-shaped particles having a length to diameter ratio of greater than 5, more preferably at least about 1.5 to about 20 weight %, and most preferably about 2 to about 20 weight %. In a preferred embodiment of the invention, at least 50% the fluoropolymer particles of this invention are generally cylindrical having a length to diameter ratio of greater than 1.5. More preferably, at least about 90% of the fluoropolymer particles in the dispersion according to invention are generally cylindrical in shape with only a small minority of the particles being generally spherical. Preferably, the dispersion particles produced have a number average length of about 220 to about 500 nm and a number average diameter of from about 150 to about 300 nm. In a preferred embodiment, the dispersion particles have a number average length of about 250 to about 500 nm and a number average diameter of about 150 to about 250. The rod-shaped dispersion particles have a number average diameter of less than about 150 nm. It has been observed, as described in the Examples of this invention, that CCT increases with particle size.

The dispersions containing rod-shaped particles in amounts in accordance with the invention provides high CCT to the dispersion coatings of this invention. As will be exemplified, the presence of too few rods reduces the CCT. Preferably, the number of rod-shaped particles does not exceed 25 weight % because the presence of too many rod-shaped particles is detrimental to CCT.

Further, core/shell nature of the particles provides high shear stability of the dispersion coating compositions of this invention. The high shear stability permits these coatings to withstand forces applied by shear generated by pumping and mixing operations. High shear stability facilitates internal recycling of coatings necessary for continuous operations for many application processes.

The invention provides a concentrated dispersion of non-melt-processible fluoropolymer particles in aqueous medium containing a surfactant and about 30 to about 70 weight % fluoropolymer Preferably, the dispersion has a CCT of greater than 24 micrometers when the fluoropolymer solids content is about 60 weight % and the surfactant content is about 8 weight %. In another preferred embodiment, concentrated dispersions of this invention are characterized by a CCT of greater than 20 micrometers when the fluoropolymer solids content is about 60 weight % and the surfactant content is about 6 weight %.

Preferably, the concentrated dispersion with about 60 weight % fluoropolymer and about 6 weight % surfactant has a gel time of greater than about 700 seconds, more preferably greater than about 800 seconds, even more preferably greater than 1000 seconds and most preferably greater than 1200 seconds.

In accordance with the invention, a batch polymerization process is provided for producing a non-melt-processible dispersion. The polymerization process preferably involves the steps of precharging deionized water to a stirred autoclave and precharging saturated hydrocarbon having more than 12 carbon atoms which is liquid under polymerization conditions (preferably paraffin wax) and a dispersing agent (fluorinated surfactant), preferably a perfluorinated carboxylic acid having 6 to 10 carbon atoms. The hydrocarbon acts as a stabilizer in the polymerization process, preventing or retarding the formation of coagulated polymer in the agitated system. The process further involves deoxygenating, pressurizing the autoclave with TFE to predetermined level, agitating, and bringing the system to desired temperature, e.g., 60°-100° C.

To form the core, the polymerization is carried out in a first stage during which a first amount of free radical initiator, and additional dispersing agent (fluorinated surfactant) are added to the autoclave. The first amount of initiator preferably produces polytetrafluoroethylene having an average melt creep viscosity greater than about $1.2\times10^{10}$ Pa·s, more preferably greater than about $1.3\times10^{10}$ Pa·s, most preferably greater than about $1.5\times10^{10}$ Pa·s. Preferably, the first amount of initiator produces polytetrafluoroethylene having an average melt creep viscosity of greater than about $1.0\times10^{10}$ Pa·s before about 30% of the total tetrafluoroethylene has been polymerized (including the terafluoroethylene displaced from the vapor space by the volume of polymer grown). During the first stage of the polymerization, the addition of agents providing telogenic activity is preferably minimized and most preferably the first stage is carried out without adding telogenic agents. These conditions promote the formation of rod-shaped particles, i.e., having a length to diameter ratio greater than about 5. In addition, these conditions preferably promote the formation of large amounts of generally cylindrical particles having a length to diameter ratio greater than about 1.5. The polymerization proceeds and additional TFE is added to maintain pressure. Then, during the second stage of the reaction, a second amount of free radical initiator is added with a telogenic agent and, for modified PTFE, a comonomer. The second amount of initiator produces lower molecular weight polytetrafluoroethylene or modified polytetrafluoroethylene. Preferably, the average melt creep viscosity of the polytetrafluoroethylene or modified polytetrafluoroethylene of the shell is greater than about $9\times10^9$ Pa·s and less than the average melt creep viscosity of the polytetrafluoroethylene of the core. Preferably, the average melt creep viscosity of the polytetrafluoroethylene or modified polytetrafluoroethylene of the shell is at least $0.1'10^{10}$ Pa·s less, more preferably at least $0.2\times10^{10}$ Pa·s less than the average melt creep viscosity of polytetrafluoroethylene of the core. Most preferably, the polymer produced for the shell of lower molecular weight polytetrafluoroethylene or modified polytetrafluoroethylene has an average melt creep viscosity of about $9\times10^9$ Pa·s to about $1.3\times10^{10}$ Pa·s. The second amount of initiator is at least about 10 times the first amount of initiator, preferably at least about 25 times the first amount, more preferably at least about 50 times the first amount, and most preferably at least about 100 times the first amount. The second amount of initiator and telogenic agent are added before about 95% of the total tetrafluoroethylene are polymerized. The second amount of initiator and telogenic agent are preferably added when at least about 70% of the total TFE has been polymerized, more preferably at least about 75% and most preferably at least about 80%.

During the first stage of the reaction, a high molecular weight core of PTFE is formed that is preferably at least about 70% of the mass of the fluoropolymer particle, more preferably at least about 75%, and most preferably at least about 80%. During the second stage of the reaction a shell of low molecular weight PTFE or modified PTFE is preferably formed that is complimentarily no more than about 30% of the mass of the fluoropolymer particle, more preferably no more than about 25% and most preferably no more than about 20%.

When the desired amount of TFE is consumed, the feeds are stopped, the reactor is vented, and the raw dispersion is discharged from the polymerization vessel. The supernatant paraffin wax is removed. The dispersion is coagulated, stabilized or concentrated depending on intended end use.

Figure 6:
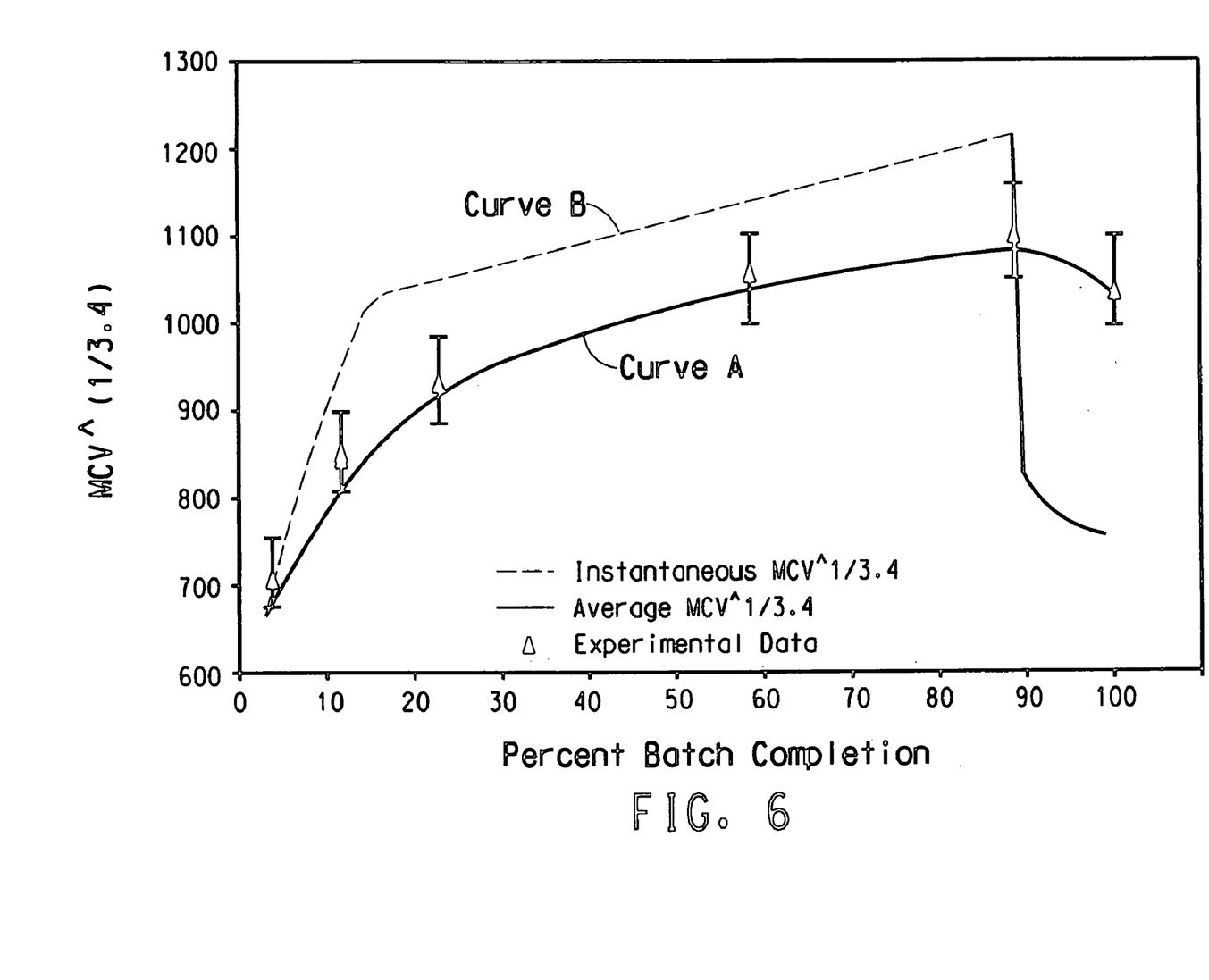
FIG. 6 is a graph showing the average melt creep viscosity (MCV) and the instantaneous melt creep viscosity, both to the $1/3.4$ power, of polymer formed during the process of this invention with respect to percent batch completion.

A graphic description of the process for an embodiment of this invention embodiment is illustrated in FIG. 6. The graph is a plot of the melt creep viscosity (MVC) to the $1/3.4$ power of a preferred dispersion polymerization process of this invention. The average MCV to the $1/3.4$ power of the growing polymer is plotted against the percentage of total tetrafluoroethylene polymerized. It is to be noted that the percentages of total TFE consumed is analogous to the fraction of particle volume or weight formed.

As stated earlier, the MCV is can be correlated with the molecular weight of the polymer. Curve A represents the average MCV to the $1/3.4$ power of polymer at various stages in the completion of the batch polymerization. All references in this application to % completion of batch polymerization include the terafluoroethylene displaced from the vapor space by the volume of polymer grown. In general the molecular weight of the batch increases until a decline of the curve begins at about 88% of total polymer formation. The increase of average MCV (increase in molecular weight) illustrates the formation of a high molecular weight core of PTFE in the first stage of the polymerization. The slight decrease of average MCV (decrease in molecular weight) towards the end of the polymerization is attributable to the formation of the lower molecular shell in the second stage of the reaction. For this embodiment the average MCV values of the polymer obtainable from Curve A indicate an average MCV of about $1.3 \times 10^{10}$ Pa·s at 30% completion; an average MCV of about $2.1 \times 10^{10}$ Pa·s at 88% completion and an average MCV of about $1.8 \times 10^{10}$ Pa·s at 100% completion. The maximum average MCV (maximum molecular weight) is obtained at about 88% completion just prior to the addition of telogenic agent and more initiator and shell formation. The final average MCV value at 100% completion is indicative of the high molecular weight desired for PTFE dispersions in use in order to achieve high flex life.

A more vivid illustration is represented by Curve B. Curve B is a theoretical depiction of the "instantaneous MCV" to the $1/3.4$ power of polymer at various stages in the completion of the batch polymerization. The instantaneous MCV, as defined earlier, shows the effect of the changing recipe conditions on the volume increment growing on the surface of a particle at that instant. The instantaneous MCV and associated instantaneous molecular weight increases until the shell portion of the batch is begun. The precipitous decline of the instantaneous MCV reflects the addition of telogenic agents and added initiator. For this embodiment, the instantaneous MCV values of the polymer obtainable from Curve B indicate an instantaneous MCV of about $2.0 \times 10^{10}$ Pa·s at 30% completion; an instantaneous MCV of about $3.1 \times 10^{10}$ Pa·s at 88% completion and an instantaneous MCV of about $6.3 \times 10^{9}$ Pa·s at 100% completion.

The dispersing agent used in this process is preferably a fluorinated surfactant. Preferably, the dispersing agent is a perfluorinated carboxylic acid having 6-10 carbon atoms and is typically used in salt form. Suitable dispersing agents are ammonium perfluorocarboxylates, e.g., ammonium perfluorocaprylate or ammonium perfluorooctanoate.

The initiators preferably used in the process of this invention are free radical initiators. They may be those having a relatively long half-life, preferably persulfates, e.g., ammonium persulfate or potassium persulfate. To shorten the half-life of persulfate initiators, reducing agents such as ammonium bisulfite or sodium metabisulfite, with or without metal catalysis salts such as Fe (Ill), can be used.

In addition to the long half-life persulfate initiators preferred for this invention, small amounts of short chain dicarboxylic acids such as succinic acid or initiators that produce succinic acid such as disuccinic acid peroxide (DSP) may be also be added in order to reduce coagulum.

To produce the high molecular weight PTFE core, preferably no telogenic agent is added in the first stage of the reaction. In addition, quantities of agents with telogenic activity are minimized. In contrast, in the second stage of the reaction, such agents in addition to more initiator are added to reduce the molecular weight of that reached in the core. For the purposes of this patent application, the term telogenic agent broadly refers to any agent that will prematurely stop chain growth and includes what is commonly known as chain transfer agents. The term chain transfer implies the stopping of growth of one polymer chain and the initiation of growth of another in that the number of growing polymer radicals remains the same and the polymerization proceeds at the same rate without the introduction of more initiator. A telogenic agent produces lower molecular weight polymer in its presence than in its absence and the number of polymer chain radicals growing either remains the same or decreases. In practice most agents, if present in sufficient quantities, tend to decrease the number of radicals and ultimately the polymerization rate. In order to maintain rate, addition of initiator with or near the time of the agent is desirable. The telogenic agents used in this invention to produce the low molecular weight shell are typically non-polar and may include hydrogen or an aliphatic hydrocarbon or halocarbon or alcohol having 1 to 20 carbon atoms, usually 1 to 8 carbon atoms, e.g., alkanes such as ethane, or chloroform or methanol. Also effective are mercaptans such as dodecylmercaptan.

In producing a shell of modified PTFE, in addition to telogenic agent, comonomer is added in the second stage of the reaction. As stated above typical comonomers include hexafluoropropylene (HFP), perfluoro(methyl vinyl ether) (PMVE), perfluoro(propyl vinyl ether) (PPVE), perfluoro(ethyl vinyl ether) (PEVE), chlorotrifluoroethylene (CTFE), and perfluorobutyl ethylene (PFBE).

Factors in the formation of rod-shaped particles include the amount of initiator present in the reaction as well as the presence or absence of telogens, comonomers and certain surfactants. High levels of initiator suppress the formation of rod-shaped particles and therefore in polymerization the dispersions of this invention low levels of initiator are desired. Likewise substances with telogenic activity and certain comonomers such as PAVE suppress the formation of rod-shaped particles and therefore their absence is desired in the formation of the polymer core in the first stage of the reaction. Other agents such as the dispersing agent must be chosen carefully as they can play a beneficial or deleterious role in increasing the fraction of rod-shaped particles. For instance, alkyl phenol ethoxylates such as Triton® X-100, available from Dow Chemical, are avoided as dispersing agents in the first stage of the polymerization as they suppress the formation of rod-shaped particles.

For greater flex life and tensile strength, PTFE coatings of high molecular weight are desirable. Since the shell of the particle is of lower molecular weight which provides shear stability, the core molecular weight is preferably as high as practicable. Conditions suited to producing a high molecular weight core, i.e., lower initiator concentration and reagents that are free of telogenic or chain transfer activity, also produce conditions that favor large particle sizes and a selected fraction of rod-shaped particles for obtaining high CCT.

For dispersion concentration, a nonionic concentrating surfactant is added to raw dispersion and the polymer is held at a temperature above the cloud point of the nonionic surfactant. Once concentrated to about 30 to about 70 weight % fluoropolymer and preferably about 45 to about 65 weight % fluoropolymer, the upper clear supernate is removed. Further adjustment of the final solids concentration and surfactant are made as needed. One patent illustrative of concentrating is U.S. Pat. No. 3,037,953 to Marks and Whipple. For coagulation, such methods as coagulation by vigorous agitation, optionally with added electrolyte, or by freezing and thawing, can be used.

A nonionic surfactant commonly used in dispersion concentration is Triton® X-100, supplied by Dow Chemical. This surfactant is described as an octyl phenol ethoxylate. However, in order to achieve an environmentally clean manufacturing process while still maintaining excellent coating performance and shear stability, the preferred surfactant of this invention comprises an alcohol ethoxylate or mixture of alcohol ethoxylates of the formula:

$$R(OCH_2CH_2)_nOH$$

wherein R is a branched alkyl, branched alkenyl, cycloalkyl, or cycloalkenyl hydrocarbon group having 8-18 carbon atoms and n is an average value of 5 to 18. For example, the ethoxylate of this invention can be considered to be prepared from (1) a primary alcohol that is comprised of a hydrocarbon group selected from branched alkyl, branched alkenyl, cycloalkyl or cycloalkenyl or (2) a secondary or tertiary alcohol. In any event, the ethoxylate of this preferred form of the invention does not contain an aromatic group. The number of ethylene oxide units in the hydrophilic portion of the molecule may comprise either a broad or narrow monomodal distribution as typically supplied or a broader or bimodal distribution which may be obtained by blending.

The dispersions exemplified herein have high molecular weight, a high CCT, and a high shear stability. The dispersions provide coatings for substrates such as metal and glass fabric. The dispersions are applied to substrates and baked to form a baked layer on the substrate. When baking temperatures are high enough, the primary dispersion particles fuse and become a coherent mass. Coating compositions of dispersions of this invention can be used to coat fibers of glass, ceramic, polymer or metal and fibrous structures such as conveyor belts or architectural fabrics, e.g., tent material. The coatings of this invention when used to coat metal substrates have great utility in coating cooking utensils such as frying pans and other cookware as well as bakeware and small electrical household appliances such as grills and irons. Coatings of this invention can also be applied to equipment used in the chemical processing industry such as mixers, tanks and conveyors as well as rolls for printing and copying equipment.

Alternately the dispersions can be used to impregnate fibers for sealing applications and filtration fabrics. Further the dispersions of this invention can be deposited onto a support and subsequently dried, thermally coalesced, and stripped from the support to produce self-supporting films cast from the dispersion. Such cast films are suitable in lamination processes for covering substrates of metal, plastic, glass, concrete, fabric and wood.

When the dispersion is coated onto glass fabric and baked, the product can give a very high flex life making it desirable for architectural applications. The dispersion of this invention preferably has an MIT Flex Life for coated glass fabric of greater than 10,000 cycles in the warp direction or greater than 10,000 cycles in the fill direction using the test and glass fabric described below. In a more preferred embodiment, the dispersion of this invention has an MIT Flex Life for coated glass fabric of greater than 10,000 cycles in the warp direction and an MIT Flex Life for coated glass fabric of greater than 10,000 cycles in the fill direction.

The dispersion attributes provide advantages to end use applications while maintaining the economy of manufacture. The ease of processing arises from minimizing the number of passes to reach a desired coating or film thickness. In addition, the amounts of surfactants and acrylic film formers necessary for a particular thickness can be decreased if desired, thereby reducing the amounts of material to be removed in the heating and sintering steps in film forming. The high shear stability enables processing using techniques such as curtain coating which allow higher production rates and lower manufacturing costs. The high molecular weight provides for strong, abrasion resistant PTFE coatings films that show good release characteristics. The economy of production arises from short batch times, the lack of complication of blending of various dispersions, and the lower inventory costs of maintaining less material on hand.

Test Methods

Raw Dispersion Properties:

Solids content of PTFE raw (as polymerized) dispersion are determined gravimetrically by evaporating a weighed aliquot of dispersion to dryness, and weighing the dried solids. Solids content is stated in weight % based on combined weights of PTFE and water. Alternately solids content can be determined by using a hydrometer to determine the specific gravity of the dispersion and then by reference to a table relating specific gravity to solids content. (The table is constructed from an algebraic expression derived from the density of water and density of as polymerized PTFE.) Raw dispersion particle size (RDPS) is measured by photon correlation spectroscopy.

Surfactant Content:

The surfactant and solids content of stabilized dispersion are determined gravimetrically by evaporating a small weighed aliquot of dispersion to dryness following in general ASTM D-4441 but using a time and temperature such that water but not the surfactant is evaporated. This sample is then heated at 380° C. to remove the surfactant and reweighed. Surfactant content is usually stated in weight % based on PTFE solids.

Resin Properties:

Standard specific gravity (SSG) of PTFE fine powder resin is measured by the method of ASTM D-4895. If a surfactant is present, it can be removed by the extraction procedure in ASTM-D-4441 prior to determining SSG by ASTM D-4895.

Melt creep viscosity (MCV) is measured at 380° C. by a modification of the tensile creep method disclosed in U.S. Pat. No. 3,819,594, with the mold at room temperature, using a molding pressure of 200 kg/cm² (19.6 MPa), with the molding pressure held for 2 min, using a load (total weight suspended from the sample sliver) that varies with the MV to obtain a creep rate suitable for measurement, and waiting at least 30 min after application of the load for elastic response to be complete before selecting viscous response (creep) data for use in the calculation.

Rheometer pressure (extrusion pressure) is measured by the method of ASTM D-4895 Section 10.8 using 18.4 weight % isoparaffin lubricant sold under the trademark Isopar® K (ExxonMobil Chemicals) and a die with 1600:1 reduction ratio.

Beading quality is determined as in U.S. Pat. No. 3,142, 665. The quality of the extrudate is visually rated as "F" for discontinuous and from 0 to 10 for continuous extrudate, i.e., from very poor to excellent regularity and freedom from flaws.

Copolymer Composition:

Comonomer content of the modified PTFE resins is determined by Fourier transform infrared spectroscopy using the method disclosed in U.S. Pat. No. 4,837,267. For PPVE-modified PTFE, a multiplicative factor of 0.97 derived from the calibration curve is used to convert the ratio of the absorbance at 995 cm$^{-1}$ to that at 2365 cm$^{-1}$ to PPVE content in weight %.

Thermal Concentration Procedure:

In order to determine both critical cracking thickness and shear stability, the raw dispersion as polymerized (approximately 45 % solids in the examples of this invention) is concentrated. The specific gravity of the raw dispersion is measured. From the relationship between specific gravity and % solids, the weight of water and PTFE solids in one kilogram of dispersion is calculated. 1.0 milliliter of a 10% by weight solution of citric acid in water is added to one kilogram of the raw dispersion. The dispersion is gently stirred to mix the citric acid. Next 5 milliliters of concentrated ammonium hydroxide (28%) is added followed by stirring. A non-ionic surfactant is then added. The non-ionic surfactant used in the examples of this invention is Triton® X-100, supplied by Dow Chemical, unless otherwise specified. This surfactant is described as an octyl phenol ethoxylate. The neat surfactant is a liquid at room temperature and has a viscosity of 240 cps. The amount used is 6.0% or 8.0% based on the weight on the water present in the one kilogram sample. The dispersion is heated to approximately 40° C. and then stirred to disperse the surfactant. The dispersion is covered with a piece of aluminum foil and heated to 80° C. The dispersion is allowed to remain at 80° C. until concentration is complete, usually one hour. The dispersion is allowed to cool to room temperature and the upper clear supernate phase is removed with a water aspirator. The concentrated lower phase is stirred and the % solids and % surfactant determined by the methods described above. The % solids and % surfactant are then adjusted to the desired levels, usually 60 % solids and 6.0% or 8.0% surfactant based on the weight of the PTFE solids.

Critical Cracking Test Procedure (CCT):

The CCT test procedure used in the examples is a procedure to test the maximum film thickness that is obtained by coating a PTFE dispersion on a glass substrate. Dispersions are applied to plates by using Meyer rods and Fixed Path applicators, both available from Paul Gardner and Company of Pompano Beach Fla.

Glass plates (8 in×12 in) are individually identified and reused during testing. If a pattern of unusual results is detected from a particular plate it is noted as anomalous. A new plate is conditioned by use of standard dispersion, Teflon® T-30 from the DuPont Company, Wilmington Delaware using a #10 Meyer rod and completing the procedure described below. After a plate has been used, it is scraped with a straight blade razor, rinsed with water, and wiped dry for reuse.

To determine the final CCT, an approximation of the CCT range is used. That approximation may be based on prior knowledge or determined preliminarily by use of fixed path applicators of 1, 2, 3, and 4 mils.

The following table gives the average finished film weight obtained by coating a plate with Meyer Rods and Fixed Path Applicators (both purchased from Paul Gardner and Company) using 60 weight % solids stabilized dispersion as a standard.

TABLE 1

| Meyer Rod | Fixed Path (mil) | Applicator Film Weight Average (mg/inch$^2$) |
|---|---|---|
| #8 |  | 7.41 |
|  | 1 | 8.1 |
| #10 |  | 10.5 |
| #12 |  | 13 |
| #14 |  | 14.2 |
| #16 |  | 16 |
|  | 2 | 16.6 |
| #18 |  | 17.8 |
| #20 |  | 19.7 |
|  | 3 | 24.5 |
|  | 4 | 33.4 |
| #24 |  | 35.7 |
|  | 5 | 43.7 |
| #30 |  | 46 |
|  | 6 | 54 |

From the approximate range known or determined for the dispersion films, filtered dispersion (using a 5 micron syringe filter or other similar sized filter) is applied to identified glass plates using the appropriate Meyer Rods and Fixed Path applicators. Two passes of dispersion are applied horizontally across the top of the plate, approximately 2-3 inches from the top, and drawn down with either the Meyer rod or the Fixed Path applicator at as constant a rate as possible, approximately 1.5-2 seconds/plate. The plates are dried for 4 minutes at 100° C. to remove water and baked for 9 minutes at 380° C. to sintering. The plates are removed from the oven and allowed to stand until they reach room temperature. After cooling, each plate in the sequence of thinner to thicker is held up to a light and examined for five seconds to determine the presence of cracks. The first cracked film is identified. A cracked film resembles tiny whiskers. Using a straight blade razor and a template, 2 one square inch specimens are scribed from each of the last uncracked and first cracked film to produce 4 test specimens. Using a tweezers, the specimens are transferred to an analytical balance and weighed. The weight of the 4 test specimens is averaged and multiplied by a factor of 0.737 to give the final CCT in micrometers.

The derivation of 0.737 micrometers/g factor is shown below by solving for thickness.

Volume=L×W×T

T=CCT

V=# mg of film measured/specific gravity of film

Spec. gravity assumed=2.16 g/mL=2.16×10$^{-9}$ mg/cubic micrometers

L=2.54×10$^4$ micrometers

W=2.54×10$^4$ micrometers

Shear Stability:

The shear stability of concentrated dispersions is determined by a gel time test. The dispersion is concentrated as described above and 200 ml of dispersion is placed in a Waring commercial explosion resistant blender (Model 707SB, one quart size, 2 speed, air requirements –10 scfm @ 10 psi, available from Waring of New Hartford, Conn.) and stirred at the highest speed until the dispersion gels. The gel time is recorded in seconds. The test is terminated after 30 minutes if the dispersion does not gel. Between gel time tests the blender is disassembled and thoroughly cleaned.

Particle Morphology and Distribution:

Dispersion images are obtained with a Hitachi S-4700 field emission scanning electron microscope at 700 volts accelerating voltage. Samples are prepared by 1000 fold aqueous dilution of dispersion. One drop of diluted dispersion is placed on a piece of polished silicon wafer, water evaporated, and then slowly coated with 2 nanometers of iridium over a 15 minute period using VCRGroup IBS/TM2005 Ion Beam Sputterer. Images are visually inspected and particles are hand counted. Counted particles are modeled as cylinders whose height is the long axis and whose diameter is the short axis. Particle dimensions are measured with a ruler in mm and converted to nm using the scale indicated in the SEM image.

MIT Flex Life:

The test method is a modification of ASTM D-2176, the standard test method for folding endurance of paper by the MIT tester. The test is adapted to determine the flex life of dispersion coated glass fabric. The test shows the ability of a fabric to withstand repeated bending, folding and creasing.

Dispersions are coated onto a roll of plain woven base fabric of glass yarn: warp—EC3 408 tex (34×4×3), 8.1 ends/cm; fill—EC3 408 tex (34×4×3), 7.5 ends/cm. The fabric has a weight of about 650 g/m$^3$ and a thickness of about 0.027 inch (0.68 mm). (In the designation EC3, E indicates electrical grade glass and C3 indicates continuous filament yarn having a filament diameter of 3 micrometers.) The base fabric is available from Fibertech Company located Jubail Industrial City, Saudi Arabia as C1028 raw fabric. The fabric an also be obtained from Saint Gobain located in Merrimack, N.H. The base fabric is immersion coated to a coating weight of 1500 g/m$^2$. The coated fabric is dried at a temperature of 200° F. (93° C.) and then baked to sintering at a temperature of 750° F. (399° C.).

Samples of coated glass fabric (½ inch×5 inch, 1.27 cm×12.5 cm) are tested using the standard MIT folding endurance tester described in ASTM D-2176 with modifications as herein described. The standard MIT Flex Tester, folding endurance test apparatus is available from Tinius Olsen, Testing Machine Co. of Willow Grove Pa. The test apparatus is provided with a # 8 spring and a 5 lb. load is applied to the spring.

Tests are conducted in both the warp direction (machine direction) of the fabric and in the fill direction (cross machine direction) of the fabric. The results of nine tests are averaged. The test results indicate the number of double folds required to break a sample piece of fabric.

Peel Strength:

The strength of the bond is measured in both the machine direction and the cross-machine direction between two substrates of dispersion coated glass fabric having an interlayer of Teflon® FEP film fused together by heat and pressure. The bonded laminate, when cool, is pulled apart at a 180° peel using a tensile Testing Machine, Constant Rate of Extension, Instron Model No. 4532 (Instron Corporation, Canton, Mass.) operated at 50±3 mm/min (2.0±0.1 in./min) as described in ASTM-D4851 (Adhesion of Coating to Fabric Test). The test results are reported as 0.2N/cm (0.1 bf/in.) of width. The first inch of bonded sample separation recorded is disregarded. The peel strength is the average of the 5 highest and the 5 lowest peaks in the next 3 inches of sample separation.

EXAMPLES

Unless otherwise specified, solution concentrations are stated in weight % based on combined weights of solute and solvent water.

Comparative Example A

Figure 1:
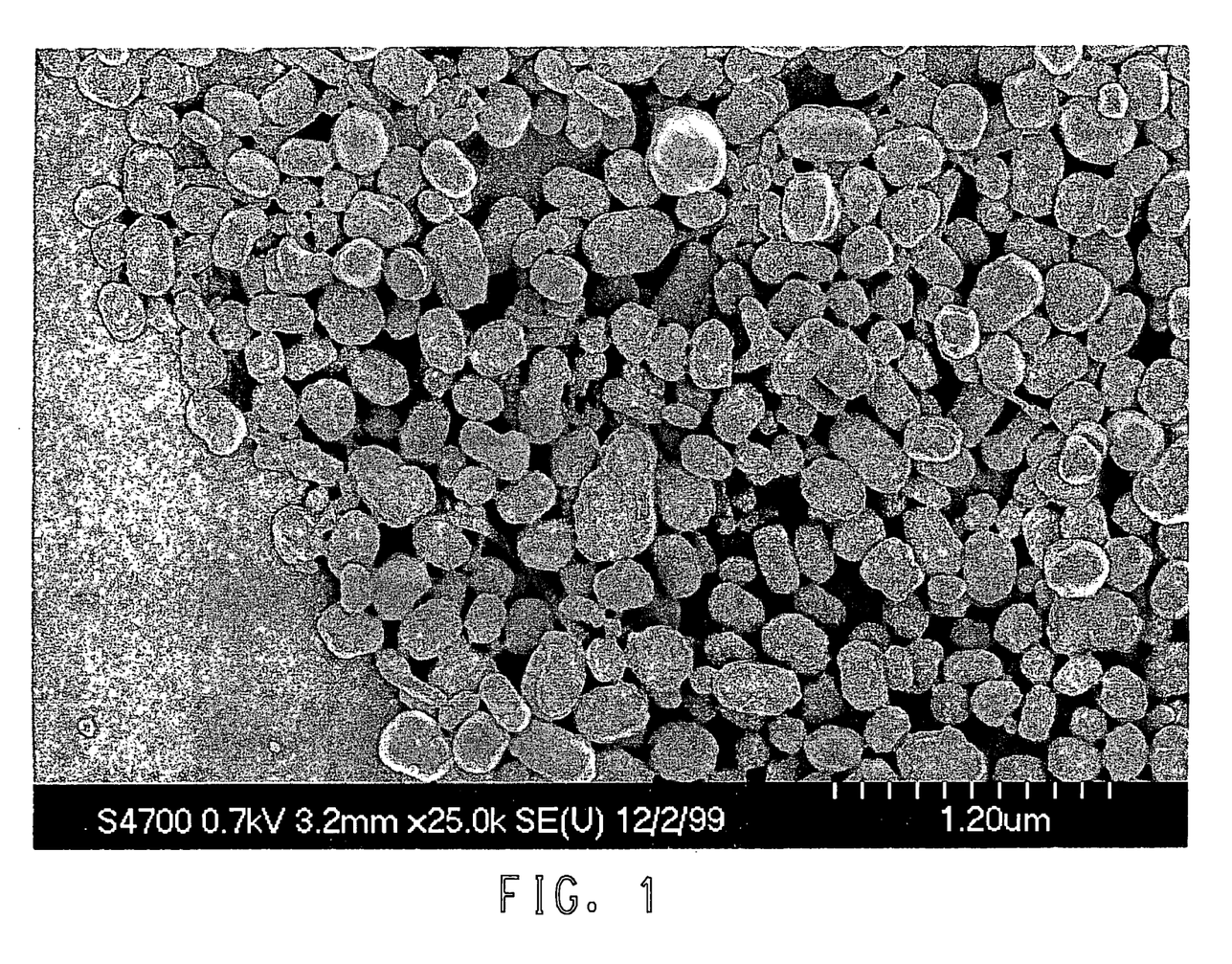
FIG. 1 is a SEM image of the dispersion of Comparative Example A at 25,000 magnification showing PTFE resin dispersion containing few rod-shaped particles. Note 1.20 micrometer scale bar.

This Comparative Example illustrates the polymerization of TFE to make a core-shell PTFE resin in dispersion form with a low amount of rod-shaped particles. A polykettle having a horizontal agitator and a water capacity of 240 parts by weight is charged with 123.5 parts of demineralized water and 5.82 parts of a paraffin wax supplied by Exxon. The contents of the polykettle are heated to 65° C., and the polykettle is evacuated and purged with TFE. Into the evacuated polykettle are charged, 3.24 parts of a solution containing 0.0616 parts of ammonium perfluorooctanoate and 0.00006 parts of Triton® X-100 per part of solution. The contents of the polykettle are agitated at 50 rpm. The temperature is increased to 90° C. TFE is then added until the pressure was 2.72 MPa. Then, 1.29 part of a fresh initiator solution of 0.07 part of disuccinyl peroxide and 0.00015 part of ammonium persulphate (APS) per part of water are added at the rate of 0.129 part/min. Once the pressure has declined by 0.1 MPa the batch is considered to have kicked off. TFE is added at a rate sufficient to maintain the pressure at 2.72 MPa. Once 8.81 parts of TFE have reacted from the kick off time, 6.47 parts of a 2.7 weight % C-8 solution is added at the rate of 0.324 part/min. TFE is added at a rate sufficient to maintain the pressure at 2.75 MPa. After 88.1 parts of TFE have been added following initial pressurizing with TFE, an additional 3.24 parts of a solution of 0.0036 parts of APS and 0.0048 parts of methanol per part of solution is added at the rate of 0.647 part/min. The polymerization time from kickoff to the second initiator addition is 60 min. After 96.9 parts of TFE have been added, the TFE feed is stopped and the polykettle pressure is allowed to decrease to 1.31 MPa. Once that pressure has been reached the agitator is turned off and the batch vented. The length of the reaction, measured from kickoff to the cessation of agitation, is 71 min. The contents are discharged from the polykettle and the supernatant wax is removed. Solids content of the raw dispersion is 45.9 weight % and RDPS is 230 nm. FIG. 1, which is a SEM image of the raw dispersion, shows that the particle shape of individual raw dispersion particles is spherical or somewhat oblong or cylindrical in about equal parts. Hand measurement of long and short dimensions of more than 200 particles modeled as cylinders give an average length of 271 nm and a diameter of 186 nm. The number fraction of particles of length 5 times the diameter (rod-shaped particles) is 2% and whose average length is 460 nm and diameter 50 nm. Based on cylindrical geometry, the amount of rod-shaped particles is 0.21 % of the total. Part of the dispersion is coagulated under vigorous agitation conditions. The coagulated dispersion (fine powder) is separated from the liquid and dried at 150° C. for three days. The PTFE fine powder resin has a SSG of 2.215, and a melt creep viscosity of 7.9×10$^9$ Pa·s. Part of the dispersion is thermally concentrated using Triton® X-100 obtaining a solids content of 60 weight %. Further addition of Triton® X-100 is made to bring the Triton® X-100 concentration to 6 weight %. The critical cracking thickness (CCT) of this dispersion is found to be 17.8 micrometers and the gel time found to be 780 seconds.

Comparative Example B

Figure 2:
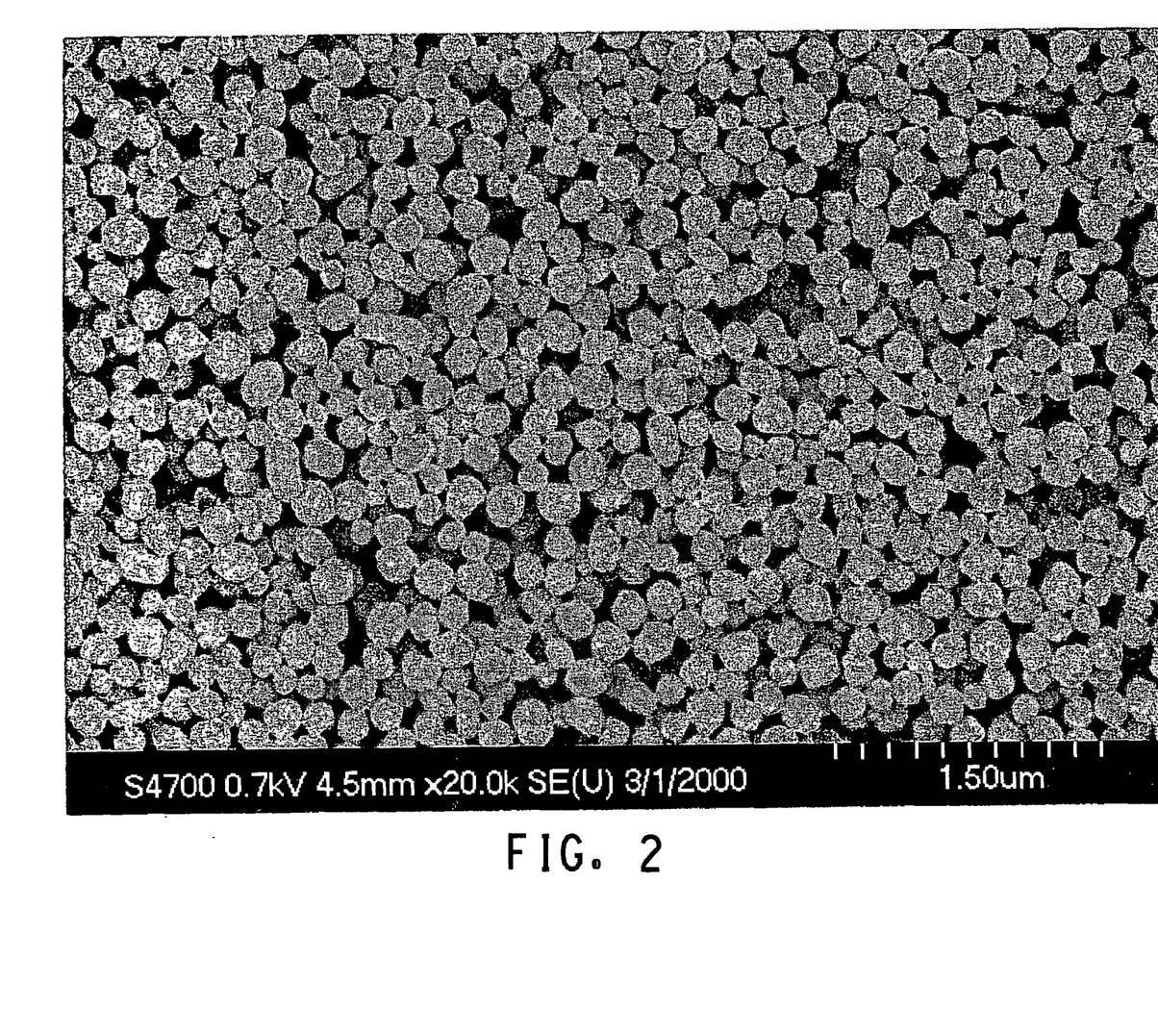
FIG. 2 is a SEM image of the dispersion of Comparative Example B at 20,000 magnification showing modified PTFE resin dispersion containing few rod-shaped particles and more spherically shaped particles than those of Comparative Example A. Note 1.50 micrometer scale bar.

This Comparative Example illustrates the addition of PPVE to the batch to provide modification of the resin throughout the particle thereby producing resin containing few rod-shaped particles and more spherically shaped particles than those of Comparative Example A but of about the same size. Gel time is increased significantly with the addition of the comonomer but the CCT is greatly reduced. The same polykettle and essentially identical amounts of ingredients are charged initially as in comparative example A except that no Triton® X-100 is charged but instead 0.49 parts of PPVE. The subsequent steps are the same except the amounts of the first initiator ingredients are decreased slightly. The amount of DSP is decreased to 0.05 parts and the APS decreased to 0.0001 parts per part of water. After 17.6 parts of have reacted the agitator is stopped and the pressure of the polykettle vented reaching a pressure of 0.17 MPa. The agitator is restarted and the polykettle is repressured with TFE to 2.86 MPa. Once 88.1 parts of TFE have reacted the second initiator solution is added. The concentration of the second initiator ingredients are increased. The amount of APS is increased to 0.005 parts and the amount of methanol to 0.006 parts per part of solution. Once 96.9 parts of TFE are reacted and the TFE addition is stopped and the pressure is allowed to decrease to 0.79 MPa before agitation ceases. The time from kickoff to the second initiator addition is 120 minutes and the time to the cessation of agitation is 130 minutes but the time used for the venting and repressuring step is 25 minutes. Solids content of the raw dispersion is 46.8 weight % and RDPS is 219 nm by LLS. FIG. 2 is a SEM image that shows that the particle shape of the raw dispersion particles is generally spherical. Measurement of the particle diameter from hand measurement of more than 80 particles showed an average particle diameter of 196 nm and no particles of length greater than 5 times the diameter. The PTFE resin obtained has an SSG of 2.2011 and a melt creep viscosity of $8.6 \times 10^9$ Pa·s, and contained 0.066 weight % PPVE. The concentrated dispersion of 6 weight % Triton® has a CCT of 5.2 micrometers and a gel time greater than 2100 seconds.

Comparative Example C

This Comparative Example demonstrates the formation of PTFE resin with more modification than Comparative Example B resulting in few rod-shaped particles and spherical particles of larger size than those of Comparative Example B. CCT is increased somewhat with larger particle. Essentially identical amounts of ingredients is used as in comparative example B except that the amount of PPVE charged is increased to 0.98 parts and the amount of ammonium perfluorooctanoate is decreased to 0.1 parts. The solids content of the raw dispersion is 44.8 and the RDPS is 280 nm. A SEM image (not shown) shows the particle shape to be predominately spherical. A hand measurement of 140 particles gave an average length of 300 nm and an average diameter of 251 nm. There are found no particles of length greater than 5 times diameter. The PTFE resin obtained has a SSG of 2.219 and a melt creep viscosity of $1.7 \times 10^9$ Pa·s and contains 0.106 weight % PPVE. The concentrated dispersion of 6 weight % Triton® has a CCT of 9.5 micrometers and a gel time greater than 2100 seconds.

Example 1

Figure 4:
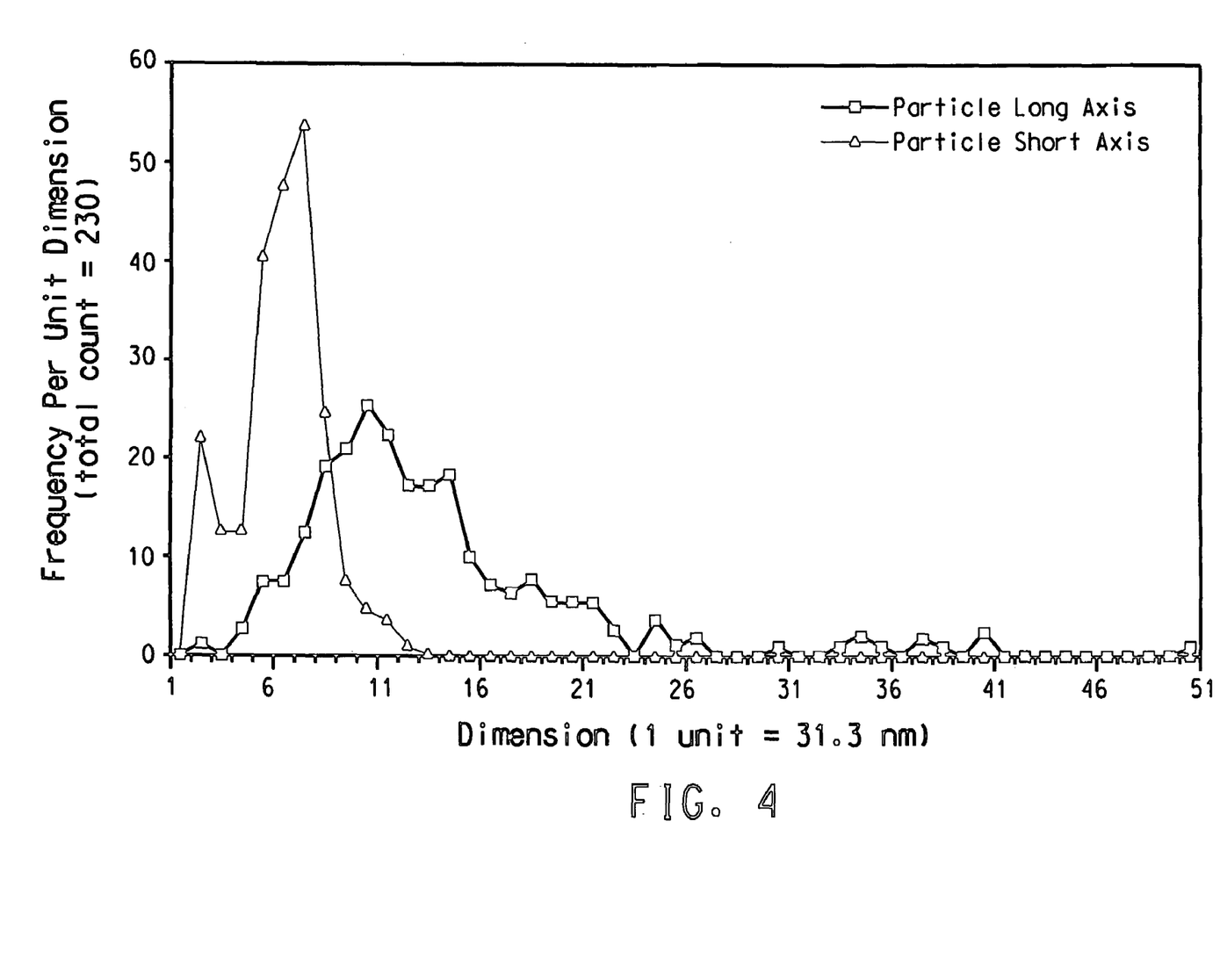
FIG. 4 is a graph showing the frequency and distribution of long and short axes of particles of Example 1.

This Example illustrates the polymerization of TFE to make fluoropolymer particles of this invention having a high molecular weight core of PTFE with a low molecular weight shell of PTFE. The presence of rod-shaped particles produces dispersion with high CCT. The same polykettle and procedures and essentially identical amounts of ingredients are charged initially as in comparative example A except that no Triton® is charged. The amounts of the first initiator ingredients are decreased. The concentration of DSP is decreased to 0.01 parts and the APS decreased to 0.00005 parts per part of water. The amounts of the second initiator ingredients are increased. The concentration of APS is increased to 0.005 parts and the methanol increased to 0.060 parts per part of water. Once TFE addition is stopped, the pressure is allowed to decrease to 0.79 MPa before agitation ceases. The time from kickoff to the second initiator addition is 68 minutes and the time to the cessation of agitation is 87 minutes. Solids content of the raw dispersion is 45.8 weight % and RDPS is 263 nm. The typical particle shape of the raw dispersion particles can be described as cylindrical with rounded ends. Only a small minority of the particles are spherical. Or, as is possible, the particle is disposed on end so that apparent appearance is spherical. A hand count of 230 particles shown in FIG. 3, a SEM image of samples obtained from the raw dispersion show the distribution of long and short axis as shown in FIG. 4. Some particles have a small axis of less than 100 nm but a long axis 5 to 20 times as large and can be described as rod-shaped. Those particles whose ratio of axes is greater than 5 comprise 10% by number of the particles counted. If the counted particles are modeled as cylinders whose height is the long axis and whose diameter is the short axis the weight percent of these particle is 2.8%. By hand measurement, the rod-shaped particles have average dimensions of 900 nm of length and 68 nm in diameter. The average length of all particles is 413 nm and the average diameter is 183 nm. The average melt creep viscosity of the core of the resin particles is $2.13 \times 10^{10}$ Pa·s and the average melt creep viscosity of the shell of the resin particles is $9.3 \times 10^9$ Pa·s. The core comprises 88.3% by weight of the particles, the shell comprising 11.7% by weight. The PTFE resin obtained has an SSG of 2.1917 and a melt creep viscosity of $19.5 \times 10^9$ Pa·s. The concentrated dispersion of 6 weight % Triton® has a CCT of 29.1 micrometers and a gel time of 991 seconds. At 8 weight % Triton® the CCT is improved to 42.5 micrometers. FIG. 4 is a typical graph showing the frequency and distribution of long and short axes of all particles in the dispersion based on a sample of 230 counted particles. The dimension of the x-axis of 1 unit is equal to 31.3 nm. The distribution denoted A marked by triangles is the distribution of particles based on the measurement of the short axis of a particle. The distribution denoted B marked by squares is the distribution of particles based on measurement of the long axis of a particle.

Example 2

The same procedure and essentially identical amounts of ingredients are used as in Example 1 except that the concentration of the ammonium perfluorooctanoate originally charged is increased to 0.1 part per part of water and the pumped ammonium perfluorooctanoate solution is reduced in concentration to 1 weight %. The solids content of the raw dispersion is found to be 45.5% and the RDPS is found to be 268 nm. A hand measurement of 328 particles from a SEM image shows pills and rod-shaped particles of average length of 325 and diameter 195. The particles whose length is greater than 5 times the diameter have an average length of 770 nm and diameter of 78 nm. The fraction of rod-shaped particles comprises 4.9% and by weight assuming cylindrical geometry is 1.9%. The PTFE resin obtained has an SSG of 2.2217. The dry resin is a free flowing powder. The resin is paste extruded at a reduction ratio of 1600:1 to give a continuous extrudate and an extrusion pressure of 29.4 MPa. The beading quality is visually rated as 2. The concentrated dispersion containing 6 weight % Triton® has a CCT of 23.9 micrometers and a gel time of greater than 1800 seconds. At 8 weight % Triton® the CCT improves to 42.3 micrometers.

Example 3

The same procedures and essentially identical amounts of ingredients are used as in Example 2 except that the concentration of the ammonium perfluorooctanoate originally charged is decreased to 0.08 parts per part of water and the pumped ammonium perfluorooctanoate is increased in concentration to 2 weight %. The solids content of the raw dispersion is found to be 45.3 % and the RDPS is found to be 283 nm. The PTFE resin obtained has an SSG of 2.209. The concentrated dispersion containing 6 weight % Triton® has a CCT of 22.9 micrometers and a gel time of greater than 1800 seconds. At 8 weight % Triton® the CCT improves to 34.5 micrometers.

Example 4

This Example illustrates the polymerization of TFE to make fluoropolymer particles of this invention having a high molecular weight core of PTFE with a low molecular weight shell of modified PTFE. Dispersions with high shear stability and good CCT's are produced. The same procedures and essentially identical amounts of ingredients are used as in Example 1 except that at the same time, in addition to the second initiator, 0.097 parts of PPVE are added at a rate of 0.097 parts/min. The solids content of the raw dispersion is found to be 45.5 weight % and the RDPS is found to be 260 nm. A hand count of 92 particles of an FIG. 5 a SEM image finds 5.4% to be rod-shaped particles which comprise 14.6 weight % by weight of the sample using cylindrical geometry. The average length of the rod-shaped particles is 1242 nm and the diameter 125 nm. The average length of all particles is 308 nm and diameter of 177 nm. The PTFE resin obtained has a SSG of 2.1889, a melt creep viscosity of $14.0 \times 10^9$ Pa·s and a PPVE content of 0.025 weight % PPVE. The concentrated dispersion containing 6 weight % Triton® has a CCT of 21.6 micrometers and a gel time of 1380 seconds. The CCT at 8 weight % Triton® is found to be 21 micrometers.

Example 5

This Example illustrates fluoropolymer particles having a high molecular weight core of PTFE with a low molecular weight shell of PTFE. concentrated in a preferred surfactant of an alcohol ethoxylate made from a branched primary alcohol surfactant. A dispersion is prepared according to the procedure of Example 1 with the exception that the raw dispersion is thermally concentrated using Novel II TDA 9.4 available from Condea Vista Corporation. The neat surfactant is a liquid at room temperature and has a viscosity of 100 cps. After adjusting the solids to 60 % and the surfactant to 6 % based on PTFE solids, a gel time of 1597 seconds is measured.

Example 6

This Example illustrates the performance properties of the dispersions of this invention when used for coatings and laminate structures in architectural applications. The example illustrates that the dispersions of this invention have outstanding performance properties associated with high molecular weight PTFE dispersions when compared to commercially available PTFE dispersion.

A core/shell dispersion is prepared according to the procedure described in Example 1 with the exception that twice the amount of disuccinyl peroxide (DSP) specified in Example 1 is used. A second dispersion is prepared using commercially available PTFE resin dispersion, Teflon® 30 available from E. I. du Pont de Nemours and Company of Wilmington, Delaware containing 60% PTFE solids and 6 % Triton X-100 (Dow Chemical) based on PTFE solids.

MIT Flex Life—Each of the dispersions is used to coat glass fabric for the MIT Flex Life test described above. Results are reported in Table 2.

TABLE 2

| | MIT Flex Life | |
|---|---|---|
| Dispersion | Warp Direction (cycles) | Fill Direction (cycles) |
| Core/shell | 17,200 | 21,400 |
| Teflon ® 30 | 6,700 | 7,230 |

Peel Strength Test—Two rectangular pieces of coated fabric as prepared for the MIT Flex Life test (7×8 inches±⅛ inch) (17.8 cm×20.3 cm±0.32 cm) each with the 8 inch (20.3 cm) dimension parallel to the warp direction (machine direction) are fused together face to back using Teflon® FEP film (8¼× 7¼±⅛ inch, 0.005-inch thick) (21 cm×18.4 cm±0.32 cm, 0.013 cm thick). Teflon® FEP is available from E. I. du Pont de Nemours and Company of Wilmington, Del. The two pieces of fabric are pressed together at 360° C. for 5 minutes at 245 psi (1.69 MPa). The bonded laminate, when cool, is pulled apart at a 180° peel using a constant rate of extension testing machine as described above. Results reported in Table 3 are the average of five laminate samples.

TABLE 3

| | Peel Strength |
|---|---|
| Dispersion | lbf/inch (N/cm) |
| Core/shell | 25.4 (44.5) |
| Teflon ® 30 | 21.2 (37.1) |

What is claimed is:

1. A batch process for producing non-melt-processible fluoropolymer dispersion comprising polymerizing tetrafluoroethylene in an aqueous medium in the presence a dispersing agent to produce fluoropolymer having an SSG of less than 2.225, said polymerizing being carried out in first stage during which a first amount of long half life free radical initiator is added and second stage during which a second amount of long half life free radical initiator and a telogenic agent are added, said first amount of initiator producing polytetrafluoroethylene having an average melt creep viscosity greater than about $1.2 \times 10^{10}$ Pa·s, and said second amount of initiator being at least about 10 times said first amount and being added before about 95% of the total tetrafluoroethylene has been polymerized, said second amount of initiator producing polytetrafluoroethylene or modified polytetrafluoroethylene, and wherein said polymerizing in said first stage is carried out so that at least about 1.5 weight % of said fluoropolymer particles comprise substantially rod-shaped particles having a length to diameter ratio of greater than about 5.

2. The process of claim 1 wherein said first amount of initiator produces polytetrafluoroethylene having an average melt creep viscosity greater than about $1.3 \times 10^{10}$ Pa·s.

3. The process of claim 1 wherein said first amount of initiator produces polytetrafluoroethylene having an average melt creep viscosity greater than about $1.5 \times 10^{10}$ Pa·s.

4. The process of claim 1 wherein said first amount of initiator produces polytetrafluoroethylene having an average melt creep viscosity of greater than about $1.0\times10^{10}$ Pa·s before about 30% of the total tetrafluoroethylene has been polymerized.

5. The process of claim 1 wherein said second amount of initiator produces polytetrafluoroethylene or modified polytetrafluoroethylene having an average melt creep viscosity greater than about $9\times10^9$ Pa·s and less than the average melt creep viscosity of the polytetrafluoroethylene of said core.

6. The process of claim 1 wherein said second amount of initiator produces polytetrafluoroethylene or modified polytetrafluoroethylene having an average melt creep viscosity at least $0.1\times10^{10}$ Pa·s less than the average melt creep viscosity of the polytetrafluoroethylene produced during said first stage.

7. The process of claim 1 wherein said second amount of initiator produces polytetrafluoroethylene or modified polytetrafluoroethylene having an average melt creep viscosity at least $0.2\times10^{10}$ Pa·s less than the average melt creep viscosity of the polytetrafluoroethylene produced during said first stage.

8. The process of claim 1 wherein said second amount of initiator produces polytetrafluoroethylene or modified polytetrafluoroethylene having an average melt creep viscosity about $9\times10^9$ Pa·s to about $1.3\times10^{10}$ Pa·s.

9. The process of claim 1 wherein said second amount of initiator and said telogenic agent are added when at least about 70% of the total tetrafluoroethylene has been polymerized.

10. The process of claim 1 wherein said long half life free radical initiator is persulfate initiator.

* * * * *

UNITED STATES PATENT AND TRADEMARK OFFICE
CERTIFICATE OF CORRECTION

PATENT NO. : 7,619,039 B2 Page 1 of 1
APPLICATION NO. : 11/407166
DATED : November 17, 2009
INVENTOR(S) : Jones et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this

Twenty-sixth Day of October, 2010

David J. Kappos
*Director of the United States Patent and Trademark Office*